June 10, 1941.                H. P. HOOD                    2,244,777
              REFRACTORY PRODUCT AND METHOD OF MAKING THE SAME
                            Filed June 17, 1937
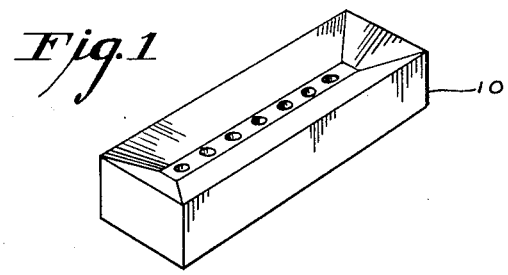
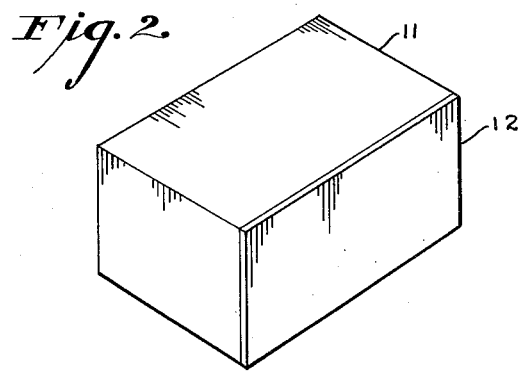
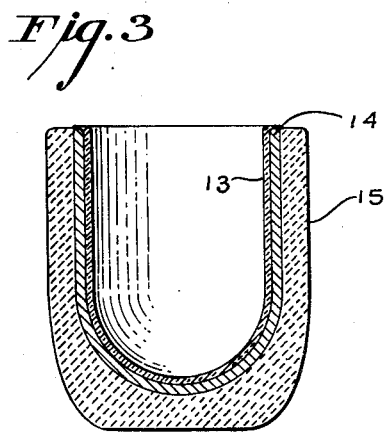
INVENTOR.
HARRISON P. HOOD
BY Dorsey, Cole & Garner
ATTORNEYS.

Patented June 10, 1941

2,244,777

UNITED STATES PATENT OFFICE 2,244,777

REFRACTORY PRODUCT AND METHOD OF MAKING THE SAME

Harrison P. Hood, Corning, N. Y., assignor to Corning Glass Works, Corning, N. Y., a corporation of New York Application June 17, 1937, Serial No. 148,784

16 Claims. (Cl. 25—156)

This invention relates to refractory material and articles capable of withstanding the corrosive action of molten glass.

One of the ever present problems related to the melting and handling of molten glass is the harmful effect of the glass on the receptacles in which it is retained. This is particularly true with respect to the pots and furnaces in which the raw materials are melted and those parts, such as feeder orifice rings, which are continuously subjected to the eroding action of a stream of molten glass.

In the long history of the glass art various substances having refractory qualities have been developed and adapted to the conditions of particular uses. Pots and tank furnaces are commonly made of calcined clay mixtures, or in some instances, of blocks cast from fused aluminous materials. Heat resisting alloys of the nickel-chromium and ferro-chromium groups have found certain applications but generally deteriorate rapidly on continued contact with molten glass and cannot be availed of for such articles as pots, tanks and feeder structures. In the laboratory, platinum crucibles are often utilized as platinum is extremely inert to corrosion by molten glass but the high cost of this material renders its general use impractical. In certain applications, thin shells of platinum and platinum alloys are placed over refractory members to provide them with a highly resistant working surface but platinum is soft and easily torn and tends to volatilize at the high temperature encountered in certain applications resulting in a very considerable loss of metal which renders its use, even in this manner, all but prohibitive.

My invention has as its object the production of new refractory compositions which shall be highly resistant to the attack of molten glass yet sufficiently cheap to be available for general use.

Precipitated stannic oxide having the chemical formula $SnO_2$ while relatively insoluble in some glasses may be dissolved in other glass compositions producing opal glasses and yellow stannous silicates. I have discovered that when this same tin oxide is molded under pressure and fired in the proper manner a dense refractory product is obtained which is practically impervious to attack by molten glass. Blocks and feeder bushings may be made of this materal and it may be applied as a protective coating on crucibles, brick and other articles of a less durable refractory nature.

In the firing of my tin oxide refractory bodies I have found that a relatively large and very slow shrinkage of the molded body takes place. This renders it extremely difficult to obtain satisfactory finished products free from warpage and of stable characteristics. I have discovered that if certain other metallic compounds are mixed with the tin oxide prior to molding and firing the rate of shrinkage may be materially increased and a dense stable body obtained in a fraction of the time required when using tin oxide alone.

Thus, the principal feature of my invention is a refractory material composed primarily of tin oxide which is extremely resistant to the corrosive attack of glass batch ingredients and which will withstand to a very high degree the eroding effect of a stream of molten glass.

A further feature of my invention relates to a method by which refractory bodies of tin oxide may be prepared with a minimum of time and effort and a maximum of acceptable articles.

Further features of my invention will be apparent on reading the accompanying description and claims.

In carrying out my invention, I have made use of finely divided and relatively pure stannic oxide which may be readily obtained as one of the grades of putty powder. When an article is molded from this raw material it has been found to shrink some 15% on firing. It has proved advantageous, therefore, to burn a quantity of raw material and prepare from it a grog which may constitute as much as 95% of the mixture from which the finished article is molded. The final formation of the desired article may be accomplished by slip casting or by molding under pressure with a relatively small amount of fluid included in the mixture. I have found that the amount of moisture included in the mixture has a very material effect upon the amount of shrinkage and the resultant density of the final product. For the best results the amount of moisture should be kept at a minimum consistent with uniform mixing and producing a readily moldable material.

Molding of the desired shape is preferably accomplished in a steel mold of desired configuration. I have successfully employed pressures ranging up to 40 tons per square inch but find that a pressure of 10,000 pounds per square inch maintained for a period of five minutes produces a satisfactory article. Such a molding procedure imparts sufficient strength to the unburnt article that it may be handled, if proper care is exercised, and carved to final shape. Following the molding operation the article is sintered by raising it to a temperature of from 1300° to 1500° C.

This should be done slowly and uniformly to prevent cracking and warping.

While I prefer to prepare my molding mixture solely from grog, raw tin oxide and water, various modifications may prove desirable. For instance, in slip casting I have found that the addition of up to 5% of Tennessee ball clay improves the handling characteristics of the article before firing. Alcohol and carbon tetrachloride may both be substituted for water in preparing a mixture to be molded under pressure and appear to press out more completely than some other available fluids thereby improving the initial density of the molded body. It has likewise been found that prefiring the mixture to 700° C. renders it somewhat more easily workable when reshaping is required.

Throughout my experimentation with tin oxide as a refractory material the large and rather slow shrinkage has presented marked difficulties greatest among them being warpage. While the amount of total shrinkage may be cut from 15% to 7% by the use of finely divided sintered tin oxide as a grog, this shrinkage is not obtained on the initial firing but continues over a long period of time and unless extreme care i° taken may continue after the refractory is actually in use. I have found, on further experimentation, that the presence of certain metallic compounds in the molding mixture has what appears to be a catalytic effect upon the tin oxide and causes shrinkage of the refractory to its final form within a period of a few hours. A considerable number of heavy metals of the first, seventh and eighth periodic groups produce this effect; copper, silver, gold, cobalt, iron, nickel and manganese being the most pronounced. These metals appear to function in the desired manner when in the oxide form and in some cases may be introduced as such. However, I have found it desirable to introduce the metal into the mixture in the form of a water soluble salt. In this manner the metal is most uniformly and intimately mixed with the tin oxide and is capable of exerting its maximum effect. Upon heating these metallic salts break down giving the desired oxide compounds. The amount of metallic compound introduced into the mixture should be so proportioned as to give from ½% to 2% of metallic oxide by weight after oxidation has taken place.

While it is possible to obtain satisfactory refractory products despite considerable variation in the proportions of the mixture and the pressures and temperatures employed, I have found that good results are obtained by adhering to the following procedure: Stannic oxide ($SnO_2$) in the amount of 900 grams is thoroughly mixed with 140 cc. of water and 18 grams of cupric chloride ($CuCl_2$). This mixture is then pressed in a steel mold of desired configuration at a pressure of 10,000 pounds per square inch for a period of about five minutes. A thin paper lining for the mold facilitates removal and handling of the unburned article. Of the 900 grams of stannic oxide, I prefer to use 30% grog of which two-thirds is composed of particles of from 12–20 mesh and the remainder is larger than 12 mesh. The pressed article is then air dried for a period of twelve hours and fired to a temperature of 1300°–1500° C. This temperature is reached in increments of 200° C., each temperature being maintained for one hour. Upon cooling, the article will be found to have shrunk some 10% and been transformed into a very strong, hard refractory material, medium brown in color and having a metallic ring when struck. This material has an apparent density of approximately 7. If desired the resulting article may be further shaped by careful grinding with carborundum abrasives. Such articles may be repeatedly heated and cooled without deleterious effects and display a most unusual resistance to the fluxing action of melting glass batch materials and the abrasive action of flowing glass. Test pieces have shown complete absence of corrosion after treatment which completely dissolved equivalent pieces of the best commercial refractory now in use.

While I prefer to form refractory articles entirely out of my new refractory, I have found that it is possible to fire a veneer of this material onto ordinary clay articles such as tank blocks, bricks and crucibles. In the manufacture of such articles I prepare a sub structure of ordinary clays such as mixtures of calcined Tennessee ball clay and Illinois kaolin to which I apply a coating of my refractory mixture which is composed of from 30–95% fine grog. The entire article is then pressed, air dried and burned to a temperature of from 1400°–1500° C. If carefully prepared the resulting article can be heated to 900° C. and quenched in water without separation of the veneer from the sub base.

While my refractory material is extremely resistant to thermal shock and the action of molten glass it is very easily reduced when placed in the presence of a reducing atmosphere at high temperatures. Accordingly, its successful preparation and operation are dependent on the presence of an oxidizing atmosphere in the furnace in which it is burned and the structure in which it is used. This difficulty may be easily overcome by the use of electric heating or so-called surface combustion so controlled as to give oxidizing conditions. In an ordinary gas fired muffle the material rapidly wastes away.

In overcoming this undesirable characteristic of my material, I have found it convenient to coat the entire surface of a refractory article with a relatively thin coating of a high melting point glass such as the well known borosilicate compositions now in common use. In applying this protective coating a layer of ground borosilicate glass is placed on the surface of the refractory article and then both are brought to a temperature of 1100° C. While good results are obtained by applying the ground glass to a green article and then firing, I prefer to first fire the tin oxide refractory and then coat it with glass by reheating to 1100° C. When my refractory articles are protected in this manner they may be subjected to ordinary muffle flames without serious effects and may be utilized in this manner to process the lower melting point glasses.

In the accompanying drawings, I have illustrated a number of articles which may be made from my material. In Fig. 1, I have shown an orifice bushing 10 for the production of glass fibres which may be made in its entirety from tin oxide. Fig. 2 illustrates a veneered tank block in which the body 11 is formed of burned clay while the glass contacting face 12 is composed of tin oxide. Fig. 3 illustrates the protection of tin oxide refractory with a high melting point glass. In this structure the body of the crucible 15 is made of burned clay, the lining 14 is tin oxide and the protective coating 13 is an inert, high melting point glass.

While I have described the preferred form of my invention modifications may be permitted with the scope of the appended claims.

I claim:

1. As a new article of manufacture, a fabricated refractory body comprising tin oxide.

2. As a new article of manufacture, a molded refractory body having a section thereof composed of tin oxide.

3. As a new article of manufacture, a sintered refractory body composed primarily of tin oxide and containing a small amount of a compound containing a metal of the group composed of cobalt, nickel, iron, copper, silver, gold and manganese.

4. As a new article of manufacture, a sintered refractory body composed primarily of tin oxide and containing a small amount of a copper containing compound.

5. As a new article of manufacture, a sintered refractory body composed primarily of tin oxide and containing a small amount of a manganese containing compound.

6. As a new article of manufacture, a sintered refractory body composed primarily of tin oxide and containing a small amount of an iron containing compound.

7. A refractory batch mixture for molded refractory articles comprising stannic oxide and a metallic compound adapted to promote rapid shrinkage of the material when raised to sintering temperatures.

8. A refractory batch mixture for molded refractory articles comprising stannic oxide, a fluid and a compound containing copper.

9. A refractory batch mixture for molded refractory articles comprising stannic oxide, a fluid and a compound containing manganese.

10. A refractory batch mixture for molded refractory articles comprising stannic oxide, a fluid and a compound containing iron.

11. A refractory batch mixture for molded refractory articles consisting of 270 parts by weight of tin oxide grog, 630 parts of powdered stannic oxide, 140 parts of water and 18 parts of cupric chloride.

12. The method of forming refractory materials which comprises mixing stannic oxide with a small amount of a copper containing compound, molding said mixture under pressure into a body of desired shape and sintering said body.

13. The method of forming refractory materials which comprises mixing stannic oxide with a small amount of a manganese containing compound, molding said mixture under pressure into a body of desired shape and sintering said body.

14. The method of forming refractory materials which comprises mixing stannic oxide with a small amount of an iron containing compound, molding said mixture under pressure into a body of desired shape and sintering said body.

15. The method of forming refractory materials which comprises molding an article of desired configuration from finely divided stannic oxide, firing said article at sintering temperatures and promoting shrinkage of said article during firing by the incorporation therein of a shrinkage promoting agent.

16. The method of forming refractory articles which comprises moistening finely divided stannic oxide, uniformly mixing with said oxide a soluble salt of a metal which when raised to sintering temperatures will accelerate the shrinkage of the refractory, moulding said mixture to desired form and firing said form at sintering temperatures in an oxidizing atmosphere.

HARRISON P. HOOD.